United States Patent
Sovereign et al.

(10) Patent No.: US 12,055,173 B2
(45) Date of Patent: Aug. 6, 2024

(54) FLEXIBLE HEAD FASTENERS

(71) Applicant: Lockheed Martin Corporation, Bethesda, MD (US)

(72) Inventors: Randall James Sovereign, Palmdale, CA (US); Frans Hendrik Ebersohn, Ashburn, VA (US); Jonathon Robert Heinrich, Albuquerque, NM (US)

(73) Assignee: Lockheed Martin Corporation, Bethesda, MD (US)

( * ) Notice: Subject to any disclaimer, the term of this patent is extended or adjusted under 35 U.S.C. 154(b) by 378 days.

(21) Appl. No.: 17/347,819

(22) Filed: Jun. 15, 2021

(65) Prior Publication Data

US 2022/0397147 A1    Dec. 15, 2022

(51) Int. Cl.
| | |
|---|---|
| *F16B 35/06* | (2006.01) |
| *F16B 5/02* | (2006.01) |
| *F16B 23/00* | (2006.01) |
| *F16B 29/00* | (2006.01) |
| *F16B 35/04* | (2006.01) |

(52) U.S. Cl.
CPC ........ *F16B 23/0046* (2013.01); *F16B 5/0258* (2013.01); *F16B 29/00* (2013.01); *F16B 35/041* (2013.01)

(58) Field of Classification Search
CPC .... F16B 23/0046; F16B 5/0258; F16B 29/00; F16B 35/041
USPC .................. 411/402, 409, 347, 343
See application file for complete search history.

(56) References Cited

U.S. PATENT DOCUMENTS

| | | | |
|---|---|---|---|
| 1,923,647 A | 8/1933 | Vera | |
| 1,956,745 A | 5/1934 | Payne | |
| 1,966,044 A | 7/1934 | Place et al. | |
| 2,009,289 A * | 7/1935 | Caird | H01R 11/15 |
| | | | 439/479 |
| 2,226,491 A | 12/1940 | Gustafson | |
| 2,262,372 A | 11/1941 | Rogoff | |
| 2,543,705 A | 2/1951 | Place | |
| 2,780,793 A | 2/1957 | Gambale | |
| 3,056,443 A | 10/1962 | Knocke | |
| 3,122,406 A | 2/1964 | Modrey | |
| 3,220,078 A * | 11/1965 | Preziosi | F16B 21/086 |
| | | | 402/80 P |
| 3,342,236 A | 9/1967 | Clark | |
| 3,611,861 A * | 10/1971 | Schulze | F16B 21/082 |
| | | | 411/508 |
| 4,350,465 A | 9/1982 | Lovisek | |
| 4,498,825 A | 2/1985 | Pamer et al. | |
| 4,852,107 A * | 7/1989 | Hamal | H01S 3/105 |
| | | | 372/12 |
| 5,269,640 A * | 12/1993 | Jonishi | F16B 37/043 |
| | | | 411/182 |

(Continued)

*Primary Examiner* — Gary W Estremsky
(74) *Attorney, Agent, or Firm* — Baker Botts L.L.P.

(57) ABSTRACT

In one embodiment, a fastener includes a flexible head and a shank coupled to the flexible head. The flexible head includes a center head portion and a plurality of wing portions coupled to the center head portion. Each of the plurality of wing portions includes a contact area configured to contact a first surface of a part to be fastened. The shank includes a clip groove configured to hold a retainer clip against a second surface of the part to be fastened. The second first surface of the part to be fastened is opposite the first surface of the part to be fastened.

19 Claims, 9 Drawing Sheets

(56) References Cited

U.S. PATENT DOCUMENTS

| | | | | |
|---|---|---|---|---|
| 6,017,136 | A | * | 1/2000 | Burton ................. B60Q 1/0683 411/324 |
| 6,176,665 | B1 | | 1/2001 | Bondarowicz et al. |
| 6,984,096 | B2 | * | 1/2006 | Kraus ................. B60R 13/0206 411/908 |
| 7,017,239 | B2 | * | 3/2006 | Kurily .................. F16B 21/086 24/453 |
| 7,290,741 | B1 | * | 11/2007 | Cox ....................... A47B 91/06 248/188.4 |
| 8,662,808 | B2 | | 3/2014 | Chen |
| 8,934,247 | B2 | * | 1/2015 | Chen ....................... H01L 23/40 361/688 |
| 10,156,251 | B2 | | 12/2018 | Freis et al. |
| 10,315,558 | B2 | * | 6/2019 | Burton ................... B60Q 1/263 |
| 11,499,585 | B2 | * | 11/2022 | Hersh ..................... F16B 39/26 |
| 2002/0025241 | A1 | * | 2/2002 | Mizuno ................ F16B 37/043 411/378 |
| 2004/0208724 | A1 | | 10/2004 | Friederich et al. |
| 2005/0058523 | A1 | * | 3/2005 | Yang .................... F16B 35/065 411/187 |
| 2008/0166200 | A1 | | 7/2008 | Hippensteele et al. |

* cited by examiner

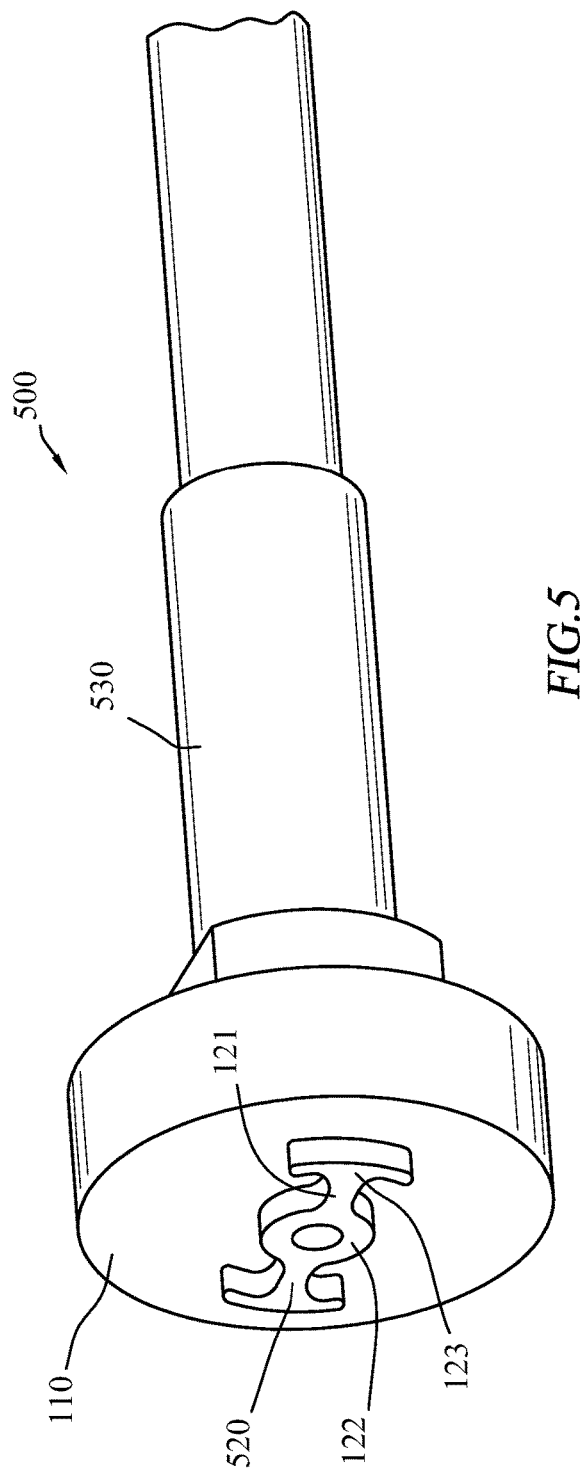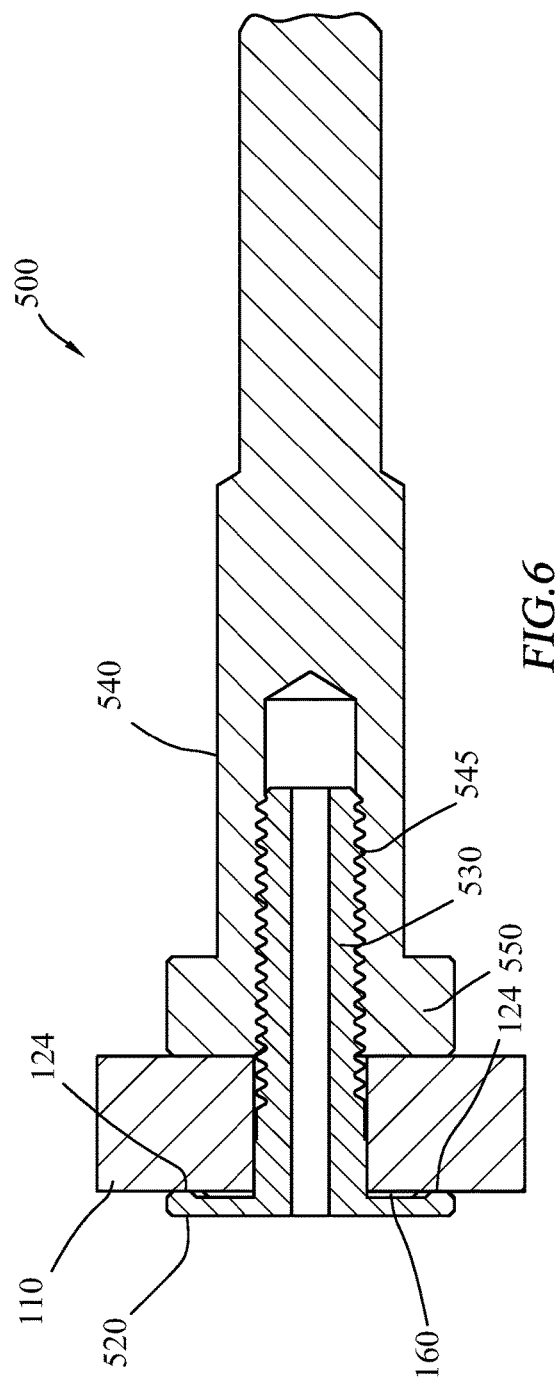

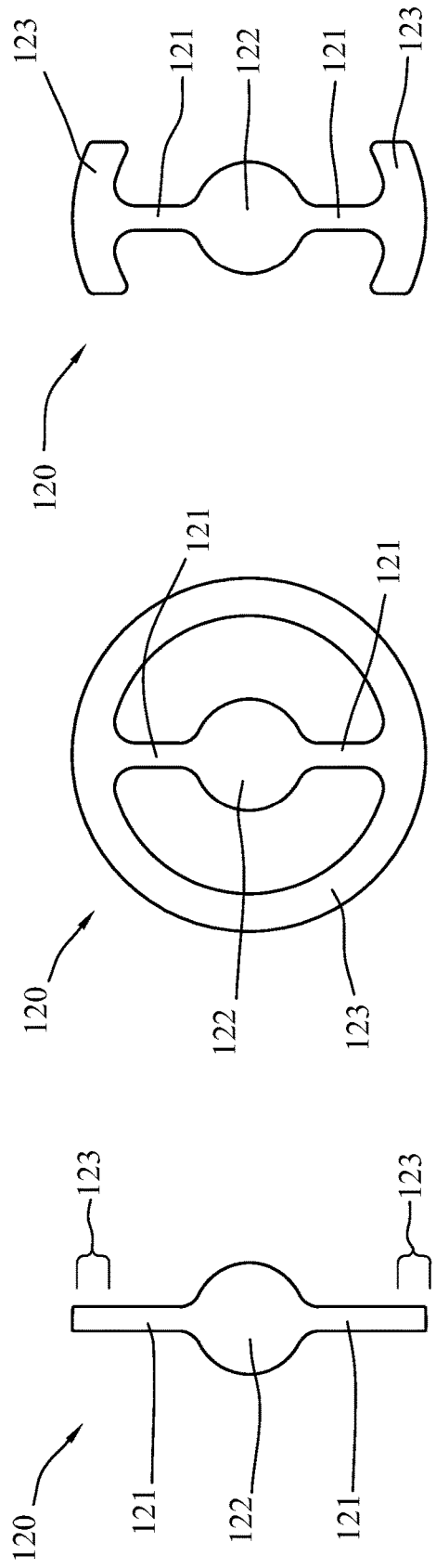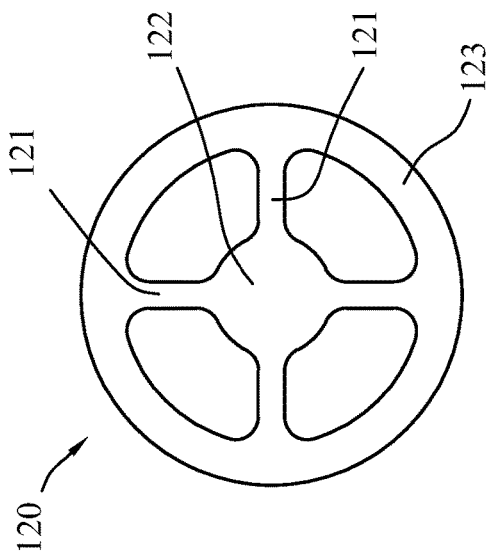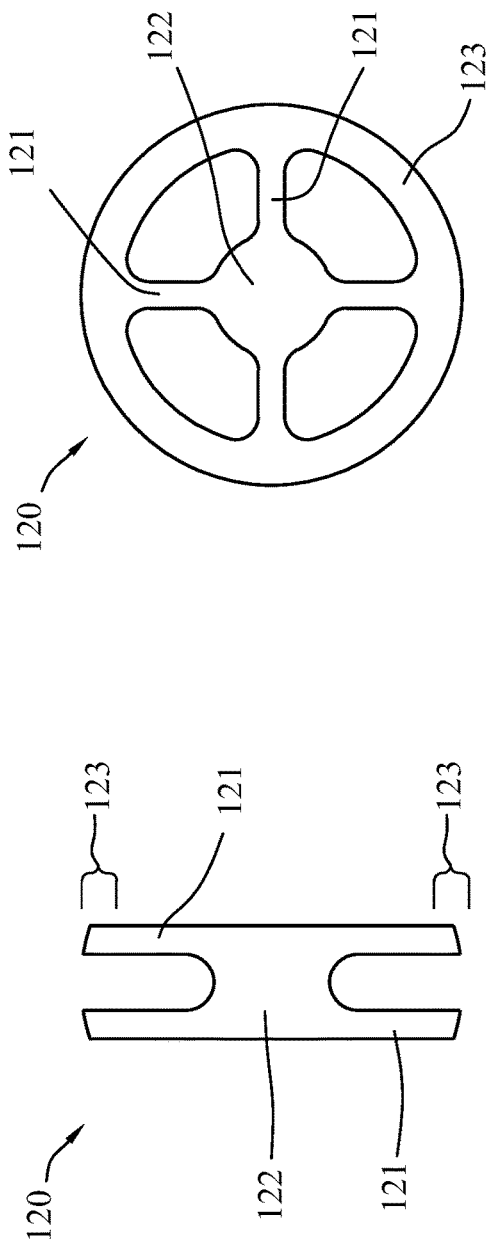

FLEXIBLE HEAD FASTENERS

TECHNICAL FIELD

This disclosure generally relates to fasteners and more specifically to flexible head fasteners.

BACKGROUND

Fasteners are used in the manufacturing processes of many different industries. For example, aircraft manufacturers use many different types of fasteners to fasten the components of an aircraft together. Some components are made of brittle materials that may crack or easily break when fastened using typical fasteners.

SUMMARY OF PARTICULAR EMBODIMENTS

In one embodiment, a fastener includes a flexible head and a shank coupled to the flexible head. The flexible head includes a center head portion and a plurality of wing portions coupled to the center head portion. Each of the plurality of wing portions includes a contact area configured to contact a first surface of a part to be fastened. The shank includes a clip groove configured to hold a retainer clip against a second surface of the part to be fastened. The second surface of the part to be fastened is opposite the first surface of the part to be fastened.

In another embodiment, a fastener includes a flexible head and a shank. The flexible head includes a center head portion and a plurality of wing portions coupled to the center head portion. Each of the plurality of wing portions includes a contact area configured to contact a first surface of a part to be fastened. The shank is coupled to the flexible head and includes a clip groove configured to hold a retainer clip against a second surface of the part to be fastened. The second surface of the part to be fastened is opposite the first surface of the part to be fastened.

In another embodiment, a fastener system includes a flexible head, a threaded shank coupled to the flexible head, and a mounting rod. The flexible head includes a center head portion and a plurality of wing portions coupled to the center head portion. Each of the plurality of wing portions includes a contact area configured to contact a first surface of a part to be fastened. The mounting rod includes a threaded aperture and a contact surface. The threaded shank is configured to be screwed into the threaded aperture in order to cause the contact surface of the mounting rod to contact a second surface of the part to be fastened.

The present disclosure provides numerous technical advantages over typical fasteners. As one example, the disclosed flexible head fasteners may be used to securely fasten brittle and fragile components without damaging the components. The disclosed fasteners have a non-standard head that flexes as the fastener is tightened. This allows the user to set a preload distance to a torque range that is lower than a typical fastener. As a result, the flexible head fastener is able to maintain compression on a fragile component through a wide range of temperatures without breaking the part during assembly.

Other technical advantages will be readily apparent to one skilled in the art from the following figures, descriptions, and claims. Moreover, while specific advantages have been enumerated herein, various embodiments may include all, some, or none of the enumerated advantages.

BRIEF DESCRIPTION OF THE DRAWINGS

FIG. 5 illustrates a perspective view of a flexible head fastener with a threaded shank, according to certain embodiments;

FIG. 6 illustrates a side view of the flexible head fastener of FIG. 5, according to certain embodiments;

FIGS. 11A-11I illustrate various heads for a flexible head fastener, according to certain embodiments.

DESCRIPTION OF EXAMPLE EMBODIMENTS

Fasteners are used in the manufacturing processes of many different industries. For example, aircraft manufacturers use many different types of fasteners to fasten various components of an aircraft together. Some components that need to be fastened are made of brittle materials that may crack or break easily when fastened using typical fasteners. For example, heaters and ceramic isolators typically require fasteners but are easily damaged due to their increased brittleness.

To address these and other problems with typical fasteners, the disclosed embodiments provide various flexible head fasteners that may be used to securely fasten brittle and fragile components without damaging the components. Each of the disclosed fasteners have a head that flexes as the fastener is tightened. This allows the user to set a preload distance to a torque range that is lower than a typical fastener. As a result, the flexible head fastener can maintain compression on a fragile component through a wide range of temperatures without breaking or damaging the component, especially during assembly.

To facilitate a better understanding of the present disclosure, the following examples of certain embodiments are given. In no way should the following examples be read to limit or define the scope of the disclosure. Embodiments of the present disclosure and its advantages may be best understood by referring to the included FIGURES, where like numbers are used to indicate like and corresponding parts.

Figure 1A:
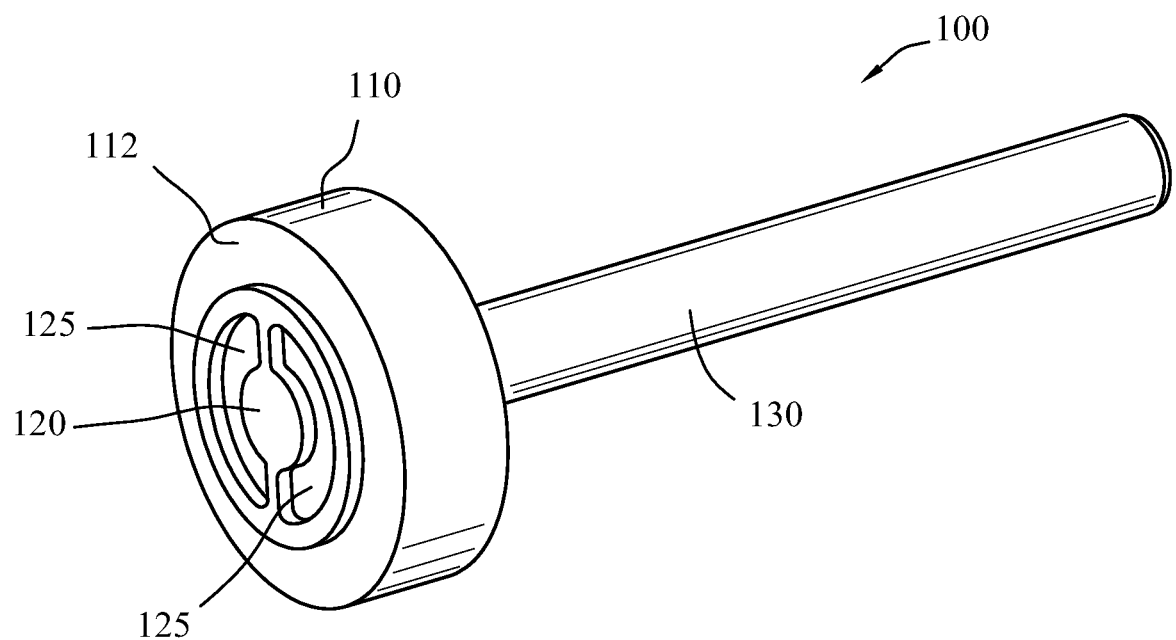
FIGS. 1A-1B illustrate perspective views of a flexible head fastener, according to certain embodiments.
Figure 1B:
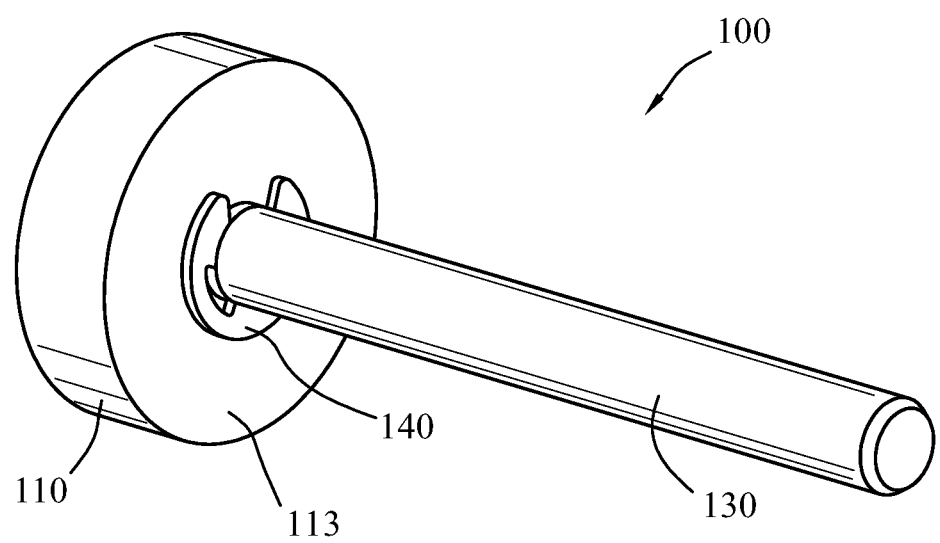
Figure 2:
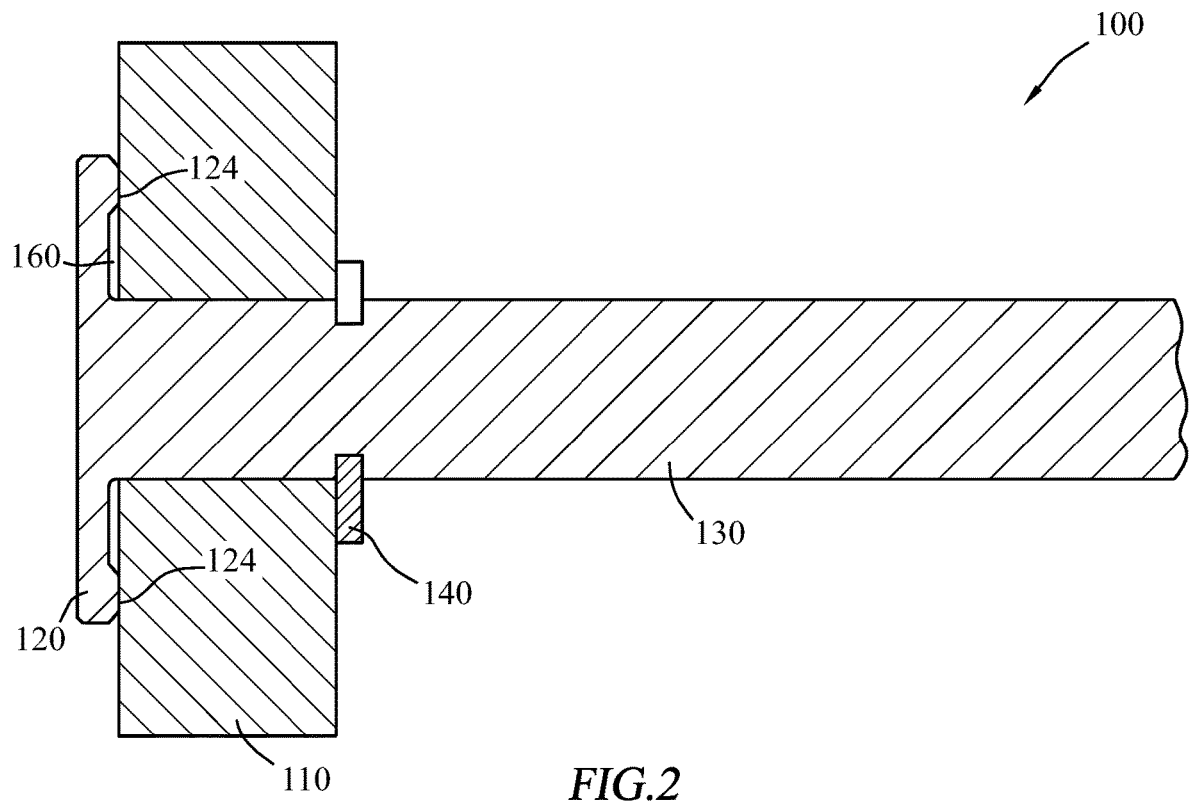
FIG. 2 illustrates a side view of the flexible head fastener of FIGS. 1A-1B, according to certain embodiments.
Figure 3:
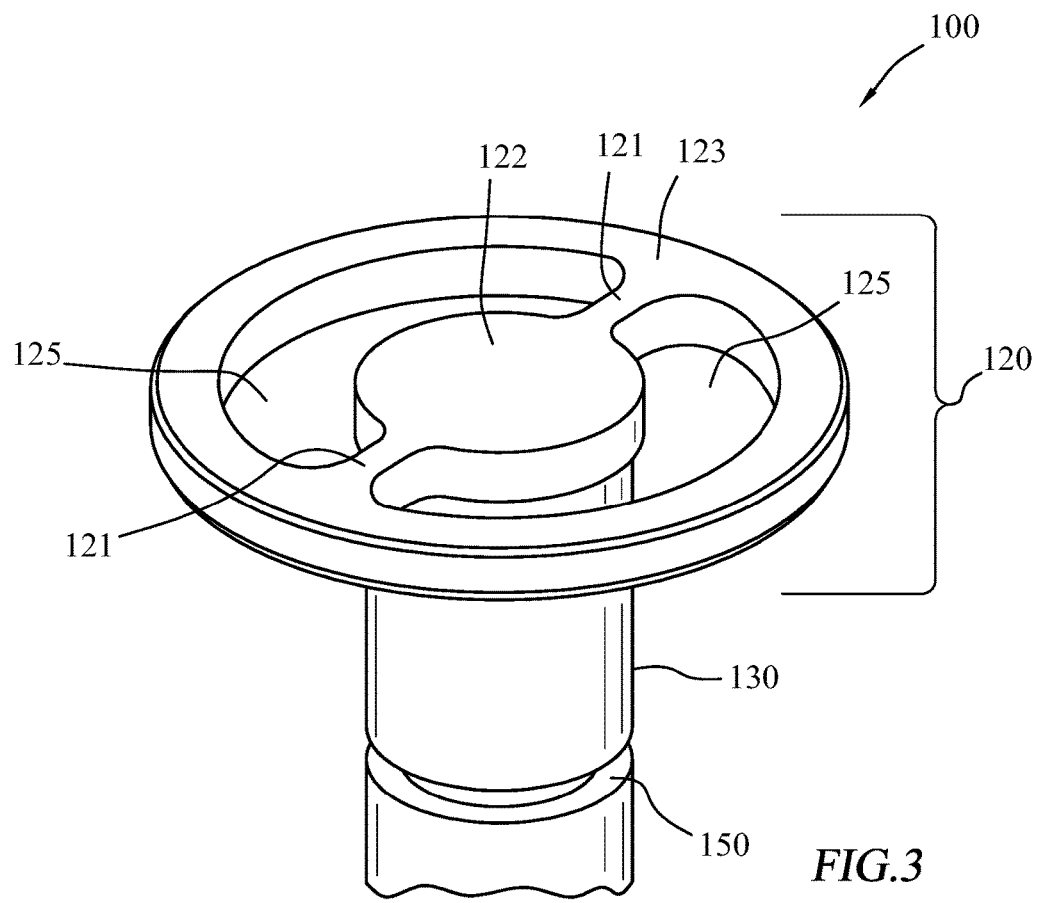
FIG. 3 illustrates a close-up view of the head of the flexible head fastener of FIGS. 1A-1B, according to certain embodiments.
Figure 4A:
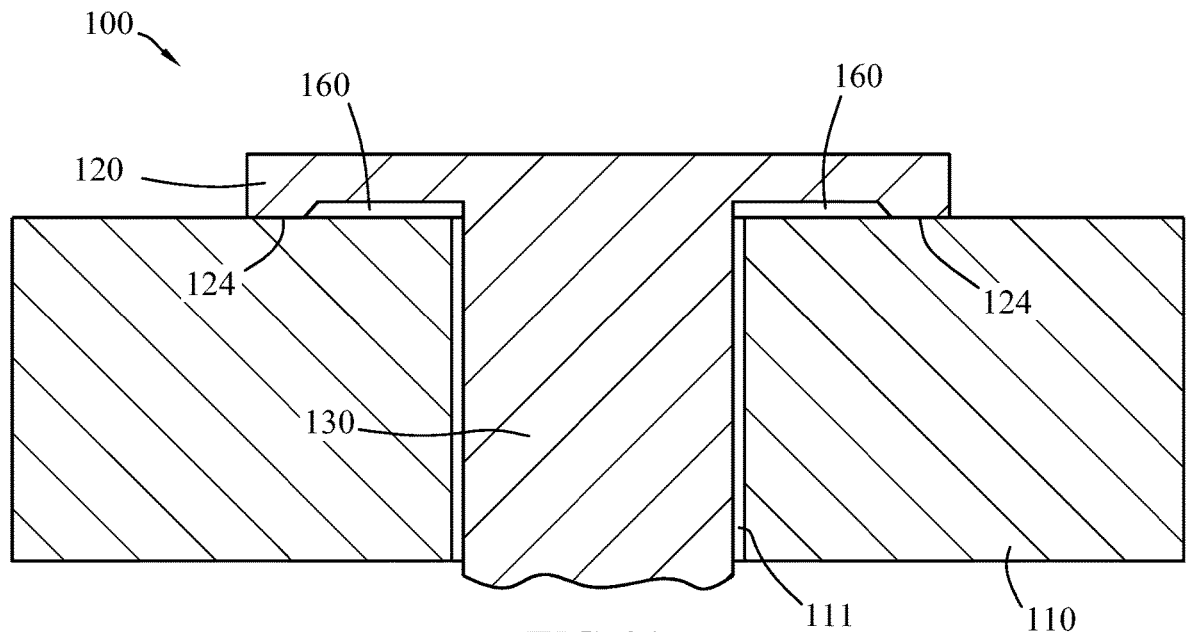
FIG. 4A illustrate the flexible head fastener of FIGS. 1A-1B under no preload, according to certain embodiments.
Figure 4B:
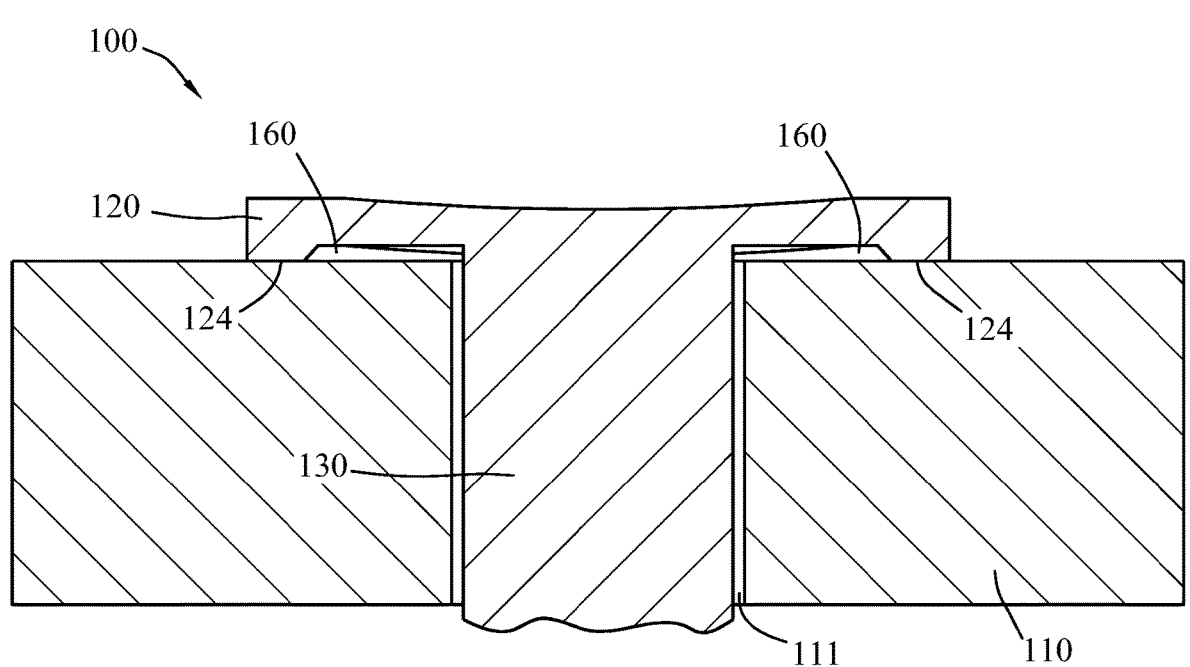
FIG. 4B illustrate the flexible head fastener of FIGS. 1A-1B after preloading, according to certain embodiments.

Certain embodiments of a flexible head fastener 100 will now be described in reference to FIGS. 1A-4B. FIGS. 1A-1B illustrate perspective views of a flexible head fastener 100, FIG. 2 illustrates a side view of flexible head fastener 100, FIG. 3 illustrates a close-up view of the head of flexible head fastener 100, FIG. 4A illustrate flexible head fastener 100 under no preload, and FIG. 4B illustrate flexible head fastener 100 after preloading, according to certain embodiments. As illustrated in these figures, flexible head fastener 100 includes a head 120 coupled to a shank 130.

Head 120 may be coupled to shank 130 using any appropriate technique (e.g., welding, using fasteners, etc.), or head 120 and shank 130 may be formed as a single unit. Flexible head fastener 100 and its various components may be formed from any appropriate material (e.g., metal, plastic, etc.) based on the intended application of flexible head fastener 100. Portions of head 120 (e.g., contact area 124) contact a first side 112 of component to be fastened 110. Shank 130 includes a clip groove 150 for holding a retainer clip 140 against a second side 113 of component to be fastened 110. In general, second side 113 of component to be fastened 110 is opposite first side 112 of component to be fastened 110. While component to be fastened 110 is described herein as a single component for convenience, it should be understood that component to be fastened 110 may include multiple components or layers that are fastened together with flexible head fastener 100.

As best illustrated in FIG. 3, head 120 generally may include at least one wing portion 121, a center head portion 122, at least one outer head portion 123, and at least one contact area 124 on an underside of head 120. In some embodiments, wing portions 121 are coupled to center head portion 122 and outer head portions 123 are coupled to wing portions 121 using any appropriate technique (e.g., welding, using fasteners, etc.). In other embodiments, all components of head 120 (i.e., wing portion 121, center head portion 122, outer head portion 123, and contact area 124) are formed as a single unit.

Figure 11F:
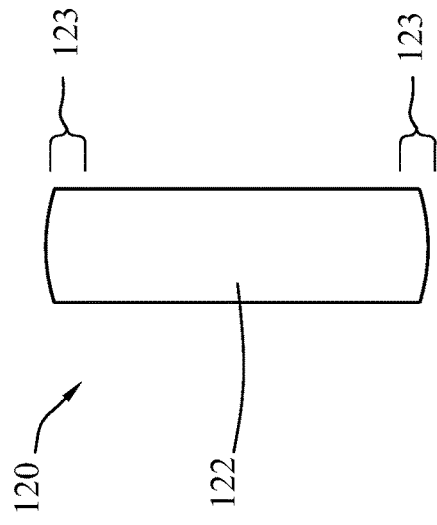

Wing portions 121 in general are connecting members between center head portion 122 and outer head portion 123. Flexible head fastener 100 may have any appropriate number of wing portions 121 (e.g., as illustrated in FIGS. 11A-11I). In addition, wing portions 121 may have any appropriate shape or dimensions (e.g., as illustrated in FIGS. 11A-11I). For example, one embodiment of flexible head fastener 100 includes two wing portions 121 that extend away from center head portion 122 in opposite directions, as illustrated in FIGS. 1A-3. In another embodiment, flexible head fastener 100 includes two wing portions 121 that extend away from center head portion 122 in a first direction, and two additional wing portions 121 that extend away from center head portion 122 in a second direction that is opposite the first direction, as illustrated in FIG. 11D. In embodiments that have wing portions 121, head 120 may include voids 125 formed by wing portions 121 and outer head portion 123. In some embodiments, wing portions 121 include an undercut area 160 that prevents at least a portion of each wing portion 121 from contacting first side 112 of component to be fastened 110. This allows head 120 to act as a spring when flexible head fastener 100 is preloaded as illustrated in FIG. 4B. In embodiments that do not include undercut area 160, a void in component to be fastened 110 (e.g., a countersink or counterbore) or a washer (not illustrated) may be utilized to allow the head 120 to flex without contacting component to be fastened 110.

Center head portion 122 is a center hub for connecting head 120 to shank 130. In some embodiments, one or more wing portions 121 are coupled to center head portion 122. In certain embodiments, center head portion 122 is circular in shape. In other embodiments, center head portion 122 may have any other appropriate shape (e.g., square, oval, hexagon, etc.).

In some embodiments, outer head portion 123 is configured to contact a first surface (i.e., first side 112) of component to be fastened 110. In some embodiments, outer head portion 123 includes one or more contact areas 124 for contacting first side 112 of component to be fastened 110. In general, contact areas 124 are raised areas on the underside of outer head portion 123. Contact areas 124 may have any appropriate dimensions and shapes. In some embodiments, each contact area 124 is located on either outer head portion 123 or wing portion 121 at a distal end of wing portion 121 (i.e., opposite ends of wing portion 121 from center head portion 122).

Outer head portion 123 may have any appropriate shape. For example, certain embodiments of outer head portion 123 may be circular in shape as illustrated in FIG. 3. In other embodiments, outer head portion 123 may have other shapes such as those shown in FIGS. 11A-11I (e.g., semi-circular, etc.).

Shank 130 is coupled to head 120 and is configured to be inserted through aperture 111 of component to be fastened 110. Shank 130 is any appropriate shape or size and may be designed based on the intended application of flexible head fastener 100. In some embodiments, shank 130 is cylindrical in shape as illustrated in the included figures but may have a cross-section in any other appropriate shape (e.g., a square, oval, hexagon, etc.). Shank 130 includes clip groove 150 for holding a retainer clip 140 against a second side 113 of component to be fastened 110. Clip groove 150 may be designed to be any distance along shank 130 from head 120 based on the thickness of component to be fastened 110. Clip groove 150 may be any shaped grove that is either partially or fully around the circumference of shank 130. Retainer clip 140 is any appropriate clip for insertion into clip groove 150 in order to hold flexible head fastener 100 against component to be fastened 110. For example, retainer clip 140 may be a bowed preloading ring, a radial retaining ring, an axial ring, and the like. Retainer clip 140 may be any appropriate material such as metal or plastic.

In general, shank 130 has a first spring constant and head 120 has a second spring constant. The second spring constant of head 120 is less than the first spring constant of shank 130. This allows portions of head 120 to flex when flexible head fastener 100 is used to fasten component to be fastened 110. This prevents flexible head fastener 100 from damaging components that may be brittle or otherwise too fragile for typical fasteners.

In operation, shank 130 is inserted through an aperture 111 of component to be fastened 110 until one or more contact areas 124 on the underside of head 120 contact first side 112 of component to be fastened 110. When flexible head fastener 100 is in a pre-load state (i.e., no force has been applied to flexible head fastener 100), as illustrated in FIG. 4A, at least one undercut 160 provides a gap between portions of head 120 and component to be fastened 110. A force may then be applied to flexible head fastener 100 in order to flex head 120, thereby preloading flexible head fastener 100 as illustrated in FIG. 4B. In the preload state, portions of head 120 (e.g., wing portions 121) flex and change shape, thereby reducing or eliminating undercut areas 160. Retainer clip 140 may then be inserted into clip groove 150 so that it contacts second side 113 of component to be fastened 110 and fastens component to be fastened 110 as intended.

Certain embodiments of a flexible head fastener 500 with a threaded shank will now be described in reference to FIGS. 5-6. FIG. 5 illustrates a perspective view of flexible head fastener 500 with a threaded shank, and FIG. 6 illustrates a side view of flexible head fastener 500 with a threaded shank, according to certain embodiments. In general, flexible head fastener 500 is similar to flexible head fastener 100 (i.e., flexible head fastener 500 includes similar features and components as described with respect to flexible head fastener 100 and may be formed of the same materials as flexible head fastener 100), except that the head of flexible head fastener 500 includes a threaded shank that allows the head to be screwed into a mounting rod of flexible head fastener 500, as described in more detail below.

Flexible head fastener 500 includes a head 520 and a mounting rod 540. Head 520, like head 120, may include at least one wing portion 121, center head portion 122, at least one outer head portion 123, and at least one contact area 124 on an underside of head 120. Head 520 may include any configuration of the features described herein with respect to head 120. Unlike head 120, however, head 520 includes a threaded shank 530. Shank 530 is configured to be inserted through aperture 111 of component to be fastened 110. Shank 530 may be fastened to head 520 using any appropriate fastener, or shank 530 and head 520 may be formed as a single unit. Shank 530 allows head 520 to be screwed into mounting rod 540. More specifically, mounting rod 540 includes a threaded aperture 545 into which shank 530 may be screwed. Shank 530 and threaded aperture 545 may have any appropriate number and type of complementary threads.

Mounting rod 540 is configured to be coupled to head 520 via shank 530. Mounting rod 540 is any appropriate shape or size, may be any appropriate material (e.g., metal or plastic), and may be designed based on the intended application of flexible head fastener 500. In some embodiments, mounting rod 540 is generally cylindrical in shape as illustrated in the included figures but may have a cross-section in any other appropriate shape (e.g., a square, oval, hexagon, etc.). In some embodiments, mounting rod 540 includes a flange 550 that is larger in diameter than the remaining body of mounting rod 540. Flange 550 contacts second side 113 of component to be fastened 110.

Mounting rod 540 includes a threaded aperture 545 that allows head 520 to be coupled to mounting rod 540 via shank 530. Threaded aperture 545 is any appropriate depth or diameter and may include any appropriate thread pattern.

In operation, shank 530 is inserted through aperture 111 of component to be fastened 110 until one or more contact areas 124 on the underside of head 520 contact first side 112 of component to be fastened 110. When flexible head fastener 500 is in a pre-load state (i.e., no force has been applied to flexible head fastener 100), at least one undercut 160 provides a gap between portions of head 520 and component to be fastened 110. Mounting rod 540 may then be screwed onto shank 530 until flange 550 contacts second side 113 of component to be fastened 110. Either mounting rod 540 or head 520 (or both) may then be rotated to apply the desired force flexible head fastener 500 in order to flex head 520 and fasten component to be fastened 110.

Figure 7A:
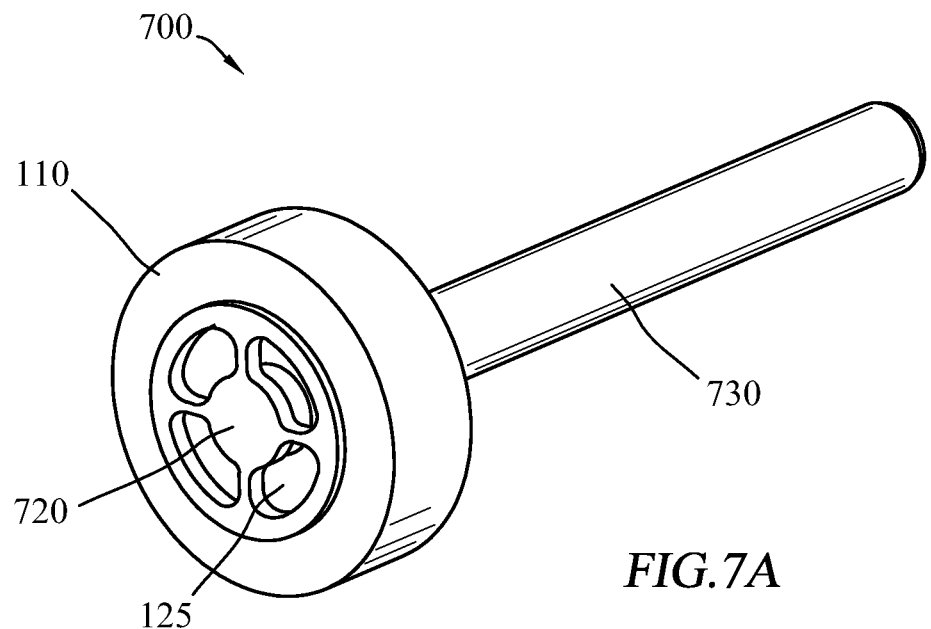
FIGS. 7A-7B illustrate perspective views of a flexible head fastener with a countersink, according to certain embodiments.
Figure 7B:
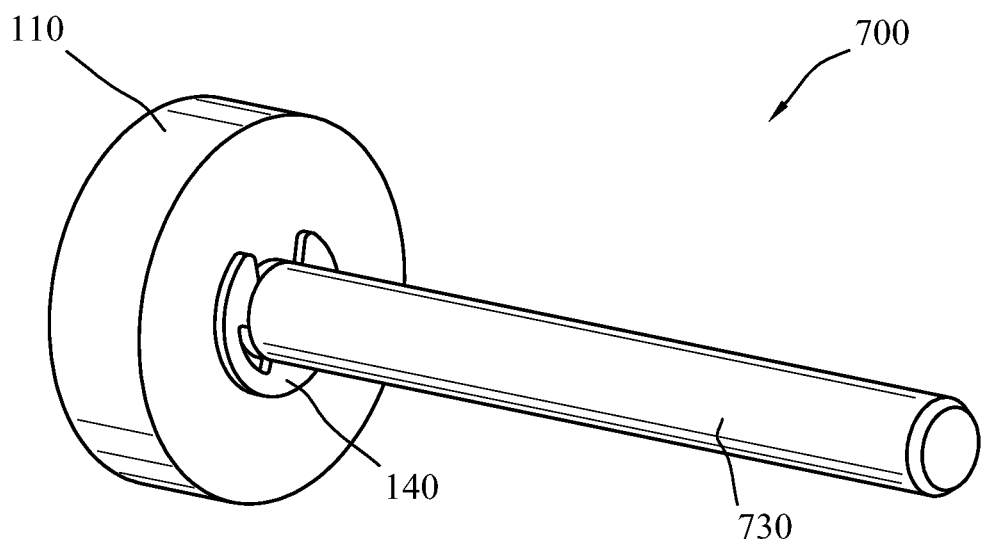
Figure 8:
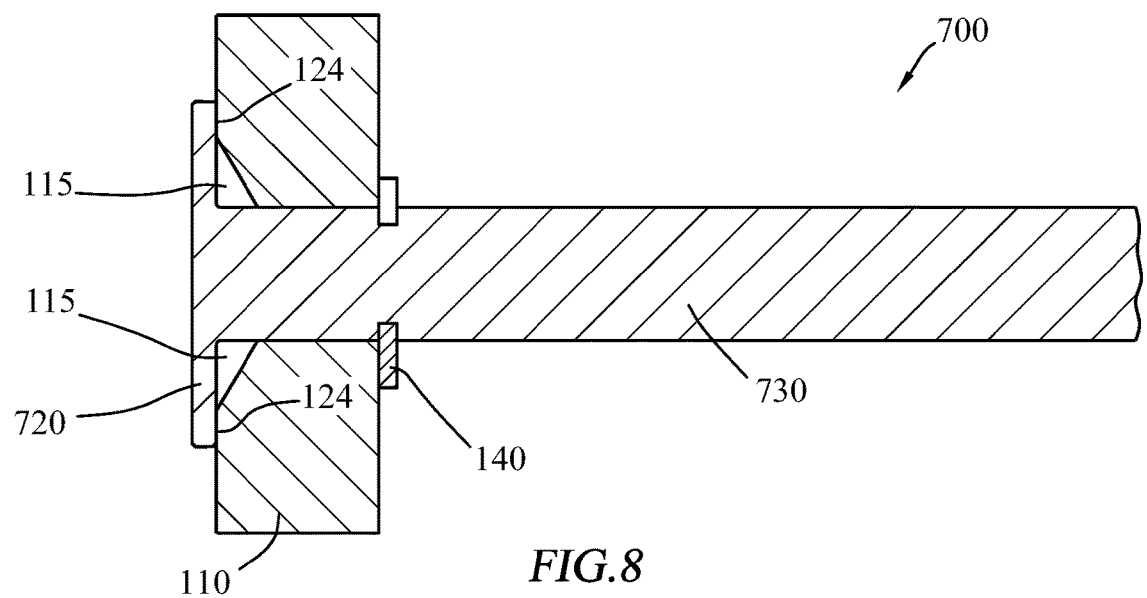
FIG. 8 illustrates a side view of the flexible head fastener of FIG. 7, according to certain embodiments.

Certain embodiments of a flexible head fastener 700 with a countersink will now be described in reference to FIGS. 7A-8. FIGS. 7A-7B illustrate perspective views of flexible head fastener 700 with a countersink, and FIG. 8 illustrates a side view of flexible head fastener 700, according to certain embodiments. Flexible head fastener 700 includes a head 720 and a shank 730. In general, flexible head fastener 700 is similar to flexible head fastener 100 (i.e., flexible head fastener 700 includes similar features and components as described with respect to flexible head fastener 100 and may be formed of the same materials as flexible head fastener 100), except that head 720 of flexible head fastener 700 includes a cone or conical-shaped countersunk portion 115 that fits into a countersink about aperture 111 of component to be fastened 110.

Figure 9:
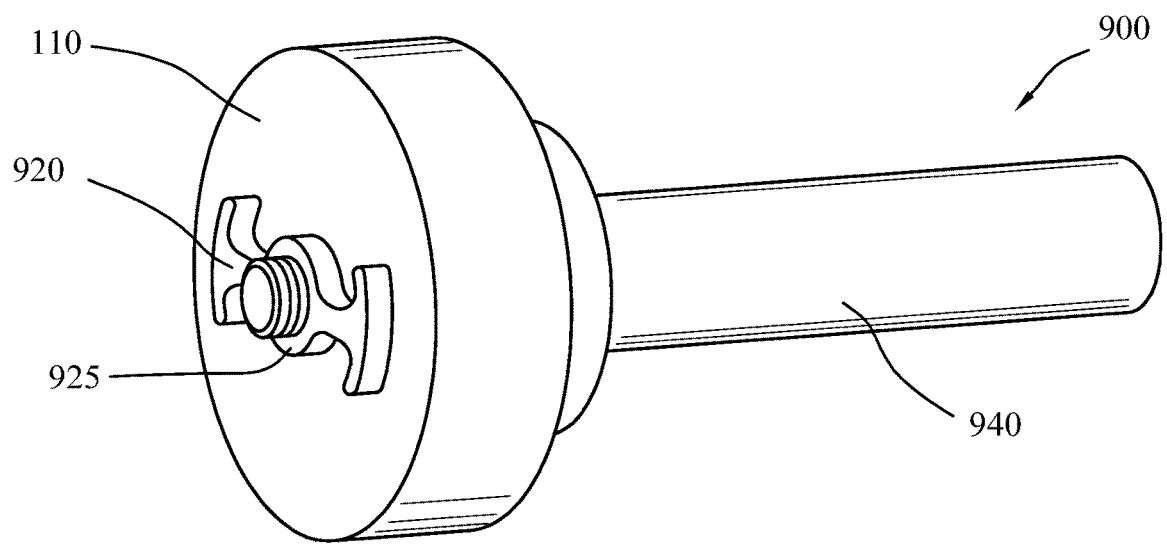
FIG. 9 illustrates a perspective view of a flexible head fastener with a threaded protrusion, according to certain embodiments.
Figure 10:
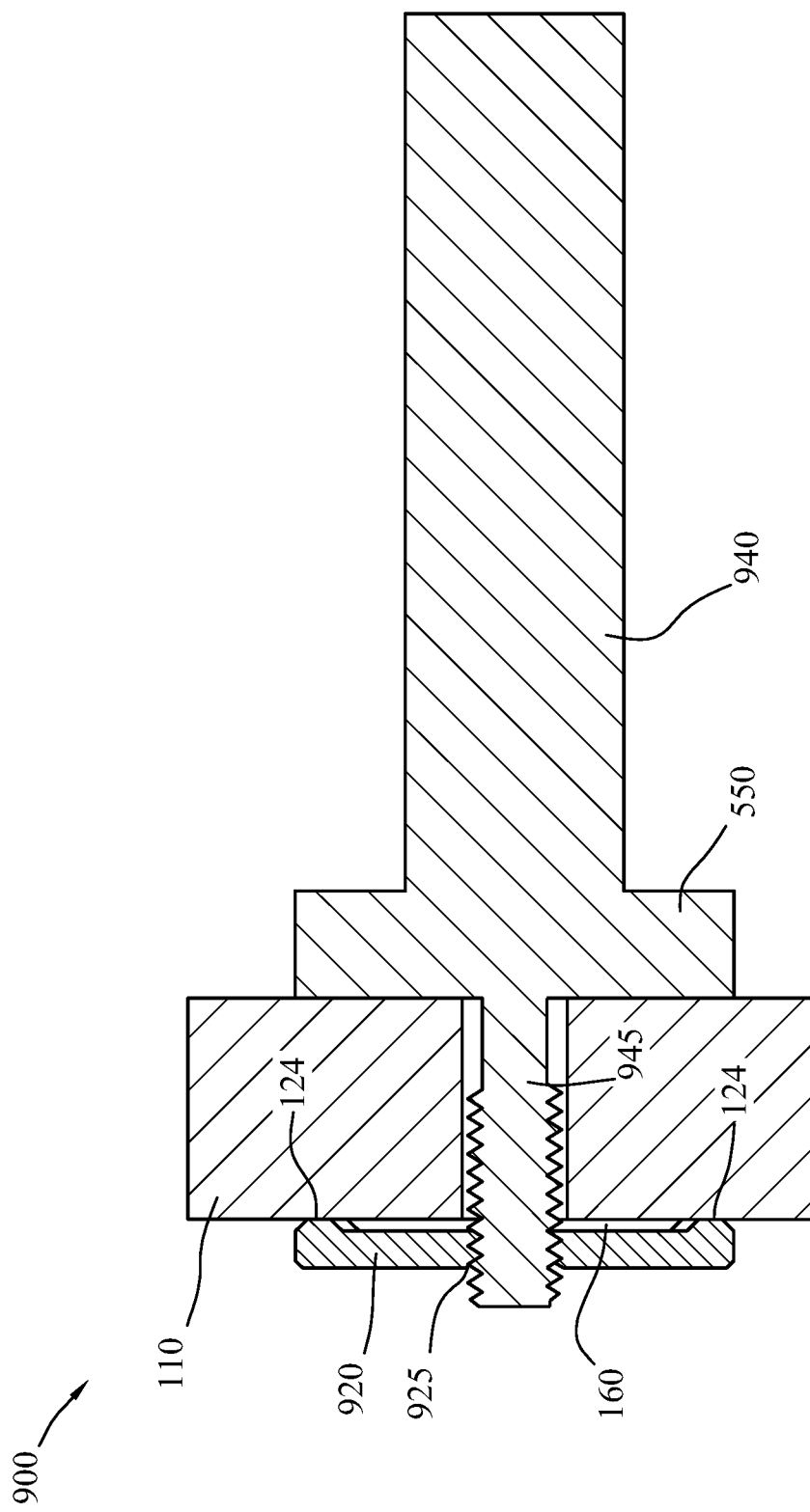
FIG. 10 illustrates a side view of the flexible head fastener of FIG. 9, according to certain embodiments.

Certain embodiments of a flexible head fastener 900 with a threaded protrusion will now be described in reference to FIGS. 9-10. FIG. 9 illustrates a perspective view of flexible head fastener 900 with a threaded protrusion, and FIG. 10 illustrates a side view of flexible head fastener 900, according to certain embodiments. Flexible head fastener 900 includes a head 920 and a mounting rod 940. In general, flexible head fastener 900 is similar to flexible head fastener 500 (i.e., flexible head fastener 900 includes similar features and components as described with respect to flexible head fastener 500 and may be formed of the same materials as flexible head fastener 500), except that mounting rod 940 includes a threaded protrusion 945 coupled to flange 550, and head 920 includes a threaded aperture 925. In operation, threaded protrusion 945 is inserted through aperture 111 of component to be fastened 110 until flange 550 contacts second side 113 of component to be fastened 110. Head 920 may then be coupled to threaded protrusion 945 via threaded aperture 925. Head 920 may be rotated until it contacts first side 112 of component to be fastened 110 and tightened a desired amount.

Figure 11G:
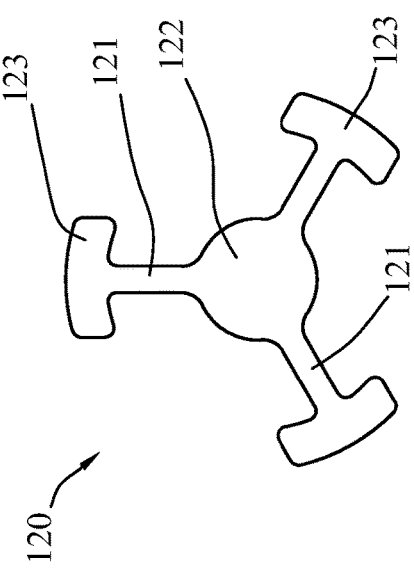
Figure 11H:
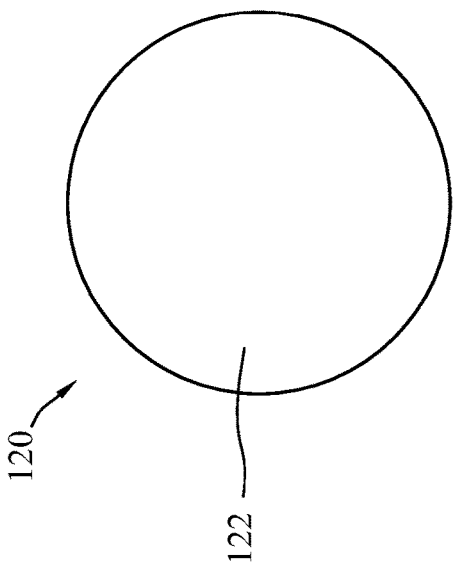
Figure 11I:
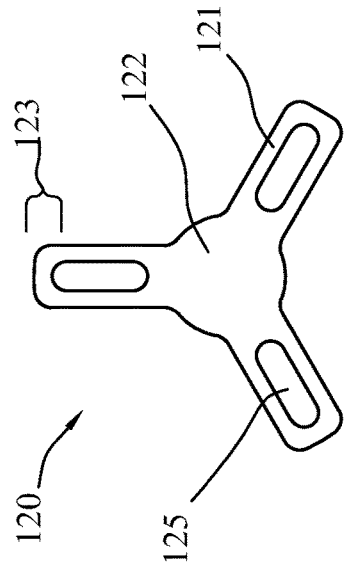

FIGS. 11A-11I illustrate various heads (i.e., heads 120, 520, 720, and 920) for a flexible head fastener (i.e., flexible head fasteners 100, 500, 700, and 900), according to certain embodiments. FIG. 11A illustrates a head 120 that includes two wing portions 121 that extend away from center head portion 122 in opposite directions. FIG. 11B illustrates a head 120 that includes two wing portions 121 that extend away from center head portion 122 in opposite directions and a ring-shaped outer head portion 123. FIG. 11C illustrates a head 120 that includes two wing portions 121 that extend away from center head portion 122 in opposite directions and two semi-circular outer head portions 123. FIG. 11D illustrates a head 120 that includes two wing portions 121 that extend away from center head portion 122 in a first direction two wing portions 121 that extend away from center head portion 122 in a second direction that is opposite the first direction. FIG. 11E illustrates a head 120 that includes four wing portions 121 and ring-shaped outer head portion 123. Wing portions 121 extend away from center head portion 122 at approximately the twelve, three, six, and nine o'clock positions. FIG. 11F illustrates a head 120 that includes three wing portions 121 that extend away from center head portion 122 and three semi-circular outer head portions 123. Wing portions 121 extend away from center head portion 122 at approximately the twelve, four, and eight o'clock positions. FIG. 11G illustrates a head 120 that includes a bar-shaped center head portion 122. FIG. 11H illustrates a head 120 that includes a circular-shaped center head portion 122. FIG. 11I illustrates a head 120 that includes six wing portions 121 that extend away from center head portion 122. Two wing portions 121 extend away from center head portion 122 at approximately each of the twelve, four, and eight o'clock positions. Each set of two wing portions 121 form a void 125 as illustrated. The disclosed embodiments are not limited to the particular embodiments of head 120 that are illustrated in FIGS. 11A-11I. Other embodiments may include any combination of wing portions 121, center head portion 122, outer head portions 123, and voids 125.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A fastener comprising:
 a flexible head comprising:
  a center head portion;
  a plurality of wing portions coupled to the center head portion;
  an outer head portion directly coupled to at least one of the plurality of wing portions, the outer head portion configured to contact a first surface of a part to be fastened;
  an undercut area that prevents at least a portion of each of the plurality of wing portions from contacting the first surface of the part to be fastened; and
 a shank coupled to the flexible head, the shank comprising a clip groove configured to hold a retainer clip against a second surface of the part to be fastened, the second surface of the part to be fastened opposite the first surface of the part to be fastened.

2. The fastener of claim 1, wherein:
 the shank comprises a first spring constant; and
 the flexible head comprises a second spring constant that is less than the first spring constant.

3. The fastener of claim 1, wherein:
 the outer head portion comprises a circular shape; and
 the flexible head comprises a plurality of voids formed by the plurality of wing portions and the outer head portion.

4. The fastener of claim 1, wherein:
 the plurality of wing portions comprises two wing portions that extend away from the center head portion in opposite directions; and
 the outer head portion comprises a semi-circular portion coupled to the end of one of the portions that is opposite the center head portion.

5. The fastener of claim 1, wherein the plurality of wing portions comprises:
 a first wing portion and a second wing portion that each extend away from the center head portion in a first direction; and
 a third wing portion and a fourth wing portion that each extend away from the center head portion in a second direction that is opposite the first direction.

6. A fastener comprising:
 a flexible head comprising:
  a center head portion;
  a plurality of wing portions coupled to the center head portion, each of the plurality of wing portions comprising a contact area configured to contact a first surface of a part to be fastened;
  an outer head portion in a circular shape, the outer head portion directly coupled to ends of the wing portions that are opposite the center head portion; and
 a shank coupled to the flexible head, the shank comprising a clip groove configured to hold a retainer clip against a second surface of the part to be fastened, the second surface of the part to be fastened opposite the first surface of the part to be fastened.

7. The fastener of claim 6, wherein each particular wing portion comprises an undercut area that prevents at least a portion of the particular wing portion from contacting the first surface of the part to be fastened.

8. The fastener of claim 6, wherein:
 the shank comprises a first spring constant; and
 the flexible head comprises a second spring constant that is less than the first spring constant.

9. The fastener of claim 6, wherein the flexible head comprises a plurality of voids formed by the plurality of wing portions and the outer head portion.

10. The fastener of claim 6, wherein:
 the plurality of wing portions comprises two wing portions that extend away from the center head portion in opposite directions.

11. The fastener of claim 6, wherein the plurality of wing portions comprises:
 a first wing portion and a second wing portion that each extend away from the center head portion in a first direction; and
 a third wing portion and a fourth wing portion that each extend away from the center head portion in a second direction that is opposite the first direction.

12. The fastener of claim 6, wherein the contact area of each particular wing portions comprises a semi-circular portion coupled to the end of each particular wing portion that is opposite the center head portion.

13. A fastener system comprising:
 a flexible head comprising:
  a center head portion;
  a plurality of wing portions coupled to the center head portion, each of the plurality of wing portions comprising a contact area configured to contact a first surface of a part to be fastened;
  an outer head portion in a circular shape, the outer head portion directly coupled to ends of the wing portions that are opposite the center head portion;
 a threaded shank coupled to the flexible head; and
 a mounting rod comprising a threaded aperture and a contact surface, wherein the threaded shank is configured to be screwed into the threaded aperture in order to cause the contact surface of the mounting rod to contact a second surface of the part to be fastened.

14. The fastener system of claim 13, wherein each particular wing portion comprises an undercut area that prevents at least a portion of the particular wing portion from contacting the first surface of the part to be fastened.

15. The fastener system of claim 13, wherein:
 the threaded shank comprises a first spring constant; and
 the flexible head comprises a second spring constant that is less than the first spring constant.

16. The fastener system of claim 13, wherein the flexible head comprises a plurality of voids formed by the plurality of wing portions and the outer head portion.

17. The fastener system of claim 13, wherein:
   the plurality of wing portions comprises two wing portions that extend away from the center head portion in opposite directions.

18. The fastener system of claim 13, wherein the plurality of wing portions comprises:
   a first wing portion and a second wing portion that each extend away from the center head portion in a first direction; and
   a third wing portion and a fourth wing portion that each extend away from the center head portion in a second direction that is opposite the first direction.

19. The fastener system of claim 13, wherein the contact area of each particular wing portions comprises a semicircular portion coupled to the end of each particular wing portion that is opposite the center head portion.

* * * * *